United States Patent
Lee et al.

(10) Patent No.: US 11,308,238 B2
(45) Date of Patent: Apr. 19, 2022

(54) SERVER AND METHOD FOR IDENTIFYING INTEGRITY OF APPLICATION

(71) Applicant: Samsung Electronics Co., Ltd., Suwon-si (KR)

(72) Inventors: Dongsun Lee, Suwon-si (KR); Donguk Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 217 days.

(21) Appl. No.: 16/601,983

(22) Filed: Oct. 15, 2019

(65) Prior Publication Data

US 2020/0167502 A1  May 28, 2020

(30) Foreign Application Priority Data

Nov. 28, 2018  (KR) .......................... 10-2018-0149333

(51) Int. Cl.
*H04L 29/06* (2006.01)
*G06F 21/64* (2013.01)
*H04L 9/32* (2006.01)

(52) U.S. Cl.
CPC ............ *G06F 21/64* (2013.01); *H04L 9/3247* (2013.01); *H04L 63/06* (2013.01)

(58) Field of Classification Search
CPC ........ G06F 21/64; H04L 9/3247; H04L 63/06
See application file for complete search history.

(56) References Cited

U.S. PATENT DOCUMENTS

| | | |
|---|---|---|
| 9,749,323 B2 | 8/2017 | Lenz et al. |
| 9,781,151 B1 | 10/2017 | McCorkendale et al. |
| 2003/0014673 A1* | 1/2003 | Baum .............. G07B 17/00733 726/26 |

(Continued)

FOREIGN PATENT DOCUMENTS

| | | |
|---|---|---|
| EP | 3 026 557 A1 | 6/2016 |
| JP | 2016-025628 A | 2/2016 |

(Continued)

OTHER PUBLICATIONS

International Search Report and Written Opinion dated Feb. 19, 2020, issued in International Application No. PCT/KR2019/013968.

(Continued)

*Primary Examiner* — Ghodrat Jamshidi
(74) *Attorney, Agent, or Firm* — Jefferson IP Law, LLP (57) ABSTRACT

A server is provided. The server according to an embodiment includes a memory, a communicator, and a processor configured to transmit an application check module for identifying integrity of an application stored in an electronic apparatus to the electronic apparatus through the communicator, and, based on identification information corresponding to the application being received from the electronic apparatus, identify integrity of the application based on the received identification information, wherein the processor is further configured to identify integrity of the application based on whether the received identification information is signed by a signature key included in the application check module, and whether the received identification information matches identification information that is pre-stored in the memory.

22 Claims, 9 Drawing Sheets

(56) References Cited

U.S. PATENT DOCUMENTS

| | | | |
|---|---|---|---|
| 2007/0006214 A1* | 1/2007 | Dubal | G06F 8/65 |
| | | | 717/171 |
| 2009/0323962 A1* | 12/2009 | Aciicmez | H04L 12/1859 |
| | | | 380/277 |
| 2010/0036817 A1* | 2/2010 | Bae | G06F 21/6218 |
| | | | 707/781 |
| 2012/0198234 A1 | 8/2012 | Chung et al. | |
| 2013/0305368 A1* | 11/2013 | Ford | G06F 21/568 |
| | | | 726/23 |
| 2014/0150096 A1 | 5/2014 | Moon et al. | |
| 2015/0319614 A1* | 11/2015 | Cho | H04W 12/04 |
| | | | 726/7 |
| 2016/0014123 A1* | 1/2016 | Shin | G06F 21/51 |
| | | | 713/152 |
| 2016/0028549 A1 | 1/2016 | Yuji | |
| 2017/0085578 A1* | 3/2017 | Ha | G06F 21/57 |
| 2017/0237567 A1* | 8/2017 | Ahn | G06F 21/54 |
| | | | 713/165 |
| 2017/0262656 A1 | 9/2017 | Salmon-Legagneur et al. | |
| 2017/0270319 A1* | 9/2017 | Salmon-Legagneur | |
| | | | G06F 21/645 |
| 2018/0240132 A1* | 8/2018 | Camenisch | G06Q 30/0185 |
| 2019/0228144 A1* | 7/2019 | Kermes | H04L 63/0281 |
| 2019/0384587 A1* | 12/2019 | Rao | H04L 9/3239 |

FOREIGN PATENT DOCUMENTS

| | | |
|---|---|---|
| KR | 10-2013-0125245 A | 11/2013 |
| KR | 10-20140106940 A | 9/2014 |
| KR | 10-2015-0022429 A | 3/2015 |
| KR | 10-2015-0039444 A | 4/2015 |
| KR | 10-2017-0140630 A | 12/2017 |
| KR | 10-2019-0046724 A | 5/2019 |
| KR | 10-2013983 B1 | 10/2019 |

OTHER PUBLICATIONS

European Search Report dated Oct. 8, 2021, issued in European Application No. 19890918.6.

\* cited by examiner

SERVER AND METHOD FOR IDENTIFYING INTEGRITY OF APPLICATION

CROSS-REFERENCE TO RELATED APPLICATIONS

This application is based on and claims priority under 35 U.S.C. § 119(a) of a Korean patent application number 10-2018-0149333, filed on Nov. 28, 2018, in the Korean Intellectual Property Office, the disclosure of which is incorporated by reference herein in its entirety.

BACKGROUND

1. Field

The disclosure relates to a server and a method for identifying integrity of an application. More particularly, the disclosure relates to a server for identifying integrity of an application stored in an electronic apparatus and a method thereof.

2. Description of the Related Art

Recently, various services such as a smart banking service, a smart home service, an email service, etc. have been provided through an electronic apparatus such as a smartphone, etc. Those types of services are provided by various applications distributed by service providers.

Although a user convenience has been improved, an application installed in a smartphone, etc. may be attacked by a hacker.

If an application is attacked by a hacker, important information of the user (e.g., account information, password information, etc.) may be leaked. For example, important user information may be leaked from a bank service provider by faking (e.g., forging, modulating, etc.) an application by applying a method of reverse engineering a bank application installed in a smartphone.

Accordingly, there is a need for identifying integrity of an application to confirm whether an application installed in an electronic apparatus is faked (e.g., forged, modulated, etc.).

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a server for identifying integrity of an application installed in an electronic apparatus and a method thereof.

Additional aspects will be set forth in part in the description which follows and, in part, will be apparent from the description, or may be learned by practice of the presented embodiments.

In accordance with an aspect of the disclosure, a server is provided. The server includes a memory, a communicator, and a processor configured to transmit an application check module for identifying integrity of an application stored in an electronic apparatus to the electronic apparatus through the communicator, and, based on identification information corresponding to the application being received from the electronic apparatus, identify integrity of the application based on the received identification information, wherein the processor is further configured to identify integrity of the application based on whether the received identification information is signed by a signing key included in the application check module, and whether the received identification information matches identification information that is pre-stored in the memory.

The processor may be further configured to deny the integrity of the application based on the received identification information not being signed by the signing key or based on the received identification information failing to match the pre-stored identification information.

The processor may be further configured to, based on a signal requesting to identify integrity of the application being received from the electronic apparatus, generate the signing key and transmit the application check module including the generated signing key to the electronic apparatus.

The processor may be further configured to, based on the signal requesting to identify integrity of the application being received again, generate a new signing key that is different from the signing key, and transmit the application check module including the new signing key to the electronic apparatus.

The processor may be further configured to obfuscate the signing key and transmit the application check module including the obfuscated signing key to the electronic apparatus.

The identification information may include a signature value obtained by signing a hash value corresponding to the application with the signing key, wherein the processor is further configured to, validity of the signature value being verified based on a signature verification algorithm, identify that the received identification information is signed by the signing key.

The processor may be further configured to transmit the application check module including the signing key to the electronic apparatus at a predetermined time interval.

The processor may be further configured to, based on a signal requesting a service of the application being received, transmit the application check module including the signing key to the electronic apparatus.

The processor may be further configured to, based on the identification information being received after a predetermined period of time passes from a time at which the application check module is transmitted to the electronic apparatus, generate a new signing key that is different from the signing key without identifying integrity of the application based on the received identification information, and transmit the application check module including the new signing key to the electronic apparatus.

The processor may be further configured to obfuscate the new signing key at a relatively higher level than an obfuscation level of an obfuscation technique applied to the signing key and transmit the application check module including the obfuscated signing key to the electronic apparatus.

In accordance with another aspect of the disclosure, a method for identifying integrity of an application is provided. The method includes transmitting an application check module for identifying integrity of an application stored in an electronic apparatus to the electronic apparatus, and, based on identification information corresponding to the application being received from the electronic apparatus, identifying integrity of the application based on the received identification information, wherein the identifying comprises identifying integrity of the application based on whether the received identification information is signed by a signing key included in the application check module, and whether the received identification information matches pre-store identification information.

The identifying may include denying the integrity of the application based on the received identification information not being signed by the signing key or based on the received identification information failing to match the pre-stored identification information.

The transmitting may include, based on a signal requesting to identify integrity of the application being received from the electronic apparatus, generating the signing key and transmitting the application check module including the generated signing key to the electronic apparatus.

The method may further include, based on the signal requesting to identify integrity of the application being received again, generating a new signing key that is different from the signing key, and transmitting the application check module including the new signing key to the electronic apparatus.

The transmitting may include obfuscating the signing key and transmitting the application check module including the obfuscated signing key to the electronic apparatus.

The identification information may include a signature value obtained by signing a hash value corresponding to the application with the signature value, wherein the identifying includes, based on validity of the signature value being verified based on a signature verification algorithm, identifying that the received identification information is signed by the signing key.

The transmitting may include identifying integrity of an application that transmits an application check module including the signing key to the electronic apparatus at a predetermined time interval.

The transmitting may include, based on a signal requesting a service of the application being received from the electronic apparatus, transmitting an application check module including the signing key to the electronic apparatus.

The method may further include, based on the identification information begin received after a predetermined time passes from a time at which the application check module is transmitted to the electronic apparatus, generating a new signing key that is different from the signing key without identifying integrity of the application based on the received identification information, and transmitting the application check module including the new signing key to the electronic apparatus.

In accordance with another aspect of the disclosure, a system for identifying integrity of an application is provided. The system includes a server configured to store identification information of each of a plurality of applications, and an external server configured to transmit a signal requesting to identify integrity of an application stored in an electronic apparatus to the server, wherein the server is further configured to, based on the signal requesting to identify the integrity being received, transmitting an application check module to the electronic apparatus, and based on identification information corresponding to the application being received from the electronic apparatus, identifying integrity of the application based on the received identification information, and wherein the server is further configured to identify integrity of the application based on whether the received identification information is signed by a signing key included in the application check module and whether the received identification information matches identification information of the application among a plurality of pieces of identification information which are pre-stored in the memory.

According to the above-described various embodiments, it is possible to prevent leakage of important information by the forged or modulated application.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms used in the following description and claims are not limited to the bibliographical meanings but, are merely used by the inventor to enable a clear and consistent understanding of the disclosure. Accordingly, it should be apparent to those skilled in the art. However, these terms may vary depending on the intentions of the person skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In describing embodiments, a detailed description of relevant known functions or components may be omitted if it would obscure the description of the subject matter.

The disclosure will be described with reference to the following drawings and features in the enclosed drawings, but the features of the disclosure are not limited thereto.

Hereinafter, the disclosure will be described with reference to the accompanying drawings.

Figure 1:
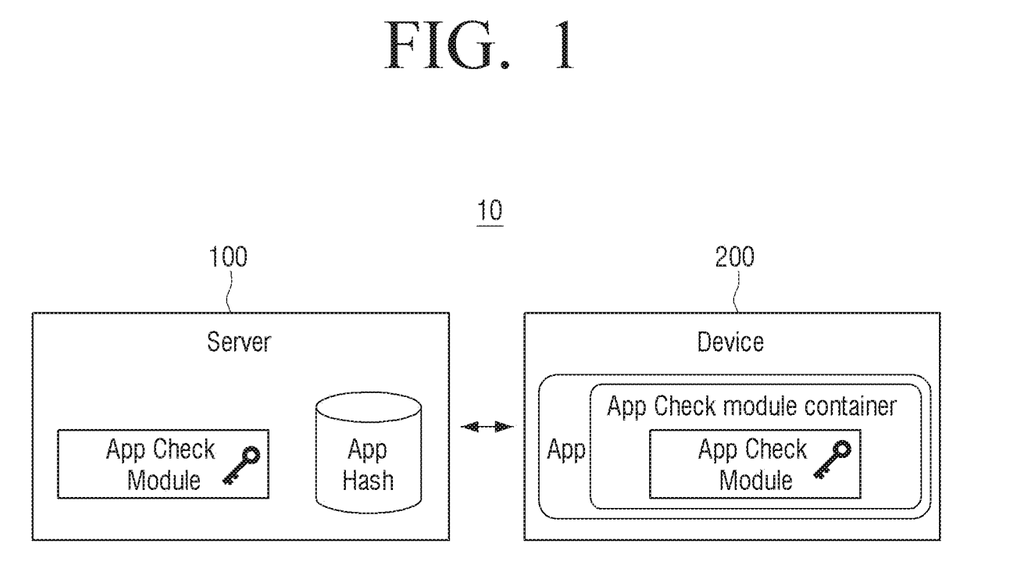
FIG. 1 is a view to explain an integrity identification system according to an embodiment of the disclosure.

FIG. 1 is a view to explain an integrity identification system according to an embodiment of the disclosure.

Referring to FIG. 1, an integrity identification system 10 may include a server 100 and an electronic apparatus 200.

The server 100 may identify integrity of an application stored in the electronic apparatus 200. For example, the server 100 may identify whether the application stored in the electronic apparatus 200 is forged or modulated. Examples of the application stored in the electronic apparatus 200 may include a banking application, a smart home application, an email application, etc.

The server 100 may transmit an application check module for identifying integrity of the application stored in the electronic apparatus 200 to the electronic apparatus 200.

The application check module may be a module for obtaining identification information of the application stored in the electronic apparatus 200. The application check module may be a module in which a hash algorithm is applied to the application stored in the electronic apparatus 200 to obtain a hash value of the application.

The server 100 may transmit an application check module including a signing key to the electronic apparatus 200. The server 100 may transmit the application check module into which the signing key is injected to the electronic apparatus 200.

When receiving the identification information of the application from the electronic apparatus 200, the server 100 may identify the integrity of the application based on whether the identification information is signed by the signing key and whether the identification information matches pre-stored identification information.

When the identification information received from the electronic apparatus 200 is validated by a signature verification algorithm and matches the pre-stored identification information, the server 100 may identify that the application is not forged or modulated. On the other hand, when the identification information is not validated by the signature verification algorithm or fails to match the pre-stored identification information, the server 100 may identify that the application is forged or modulated.

When the application is identified as being forged or modulated, the server 100 may induce deletion of the application.

By identifying the integrity of an application based on whether the identification information received from the electronic apparatus 200 is signed by a signing key included in the application check module, a user may trust that identification information of an application is obtained by an application check module provided from the server 100, and trust the identification on the integrity of the application.

Figure 2:
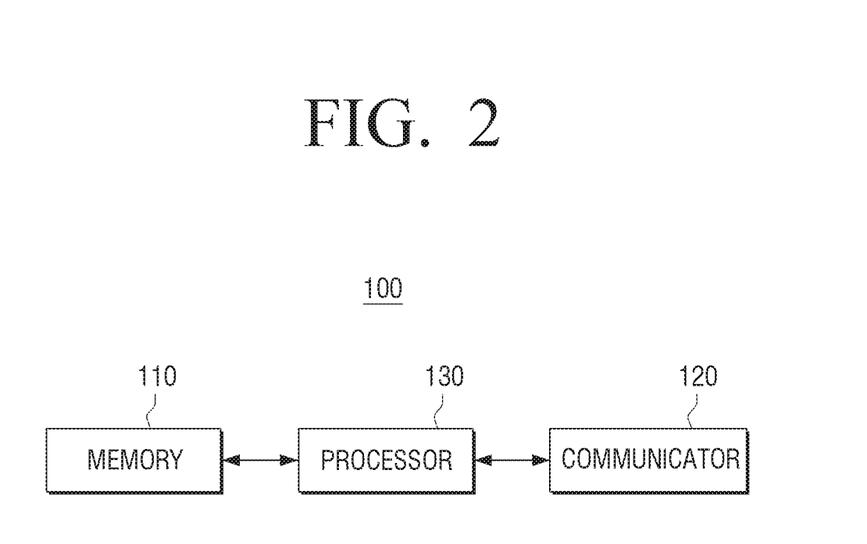
FIG. 2 is a block diagram to explain a server according to an embodiment of the disclosure.

FIG. 2 is a block diagram to explain a server according to an embodiment of the disclosure.

Referring to FIG. 2, a server 100 may include a memory 110, a communicator 120, and a processor 130.

The memory 110 may store an operating system (OS) for controlling an operation of a constituent element of the server 100 and a command or data related to the constituent element of the server 100.

The processor 130 may control a plurality of hardware or software constituent elements of the server 100 by using various commands or data stored in the memory 110, load or process commands or data received from at least one of the other constituent elements to a volatile memory, and store various data in a non-volatile memory.

The memory 110 may store identification information of an application. The identification information of the application may be information for identifying integrity of the application, such as a hash value obtained by applying a hash algorithm to the application. However, a hash value is merely an example, and the identification information may be various codes of the application before forgery or modulation.

The memory 110 may include at least one of a volatile memory or a non-volatile memory. Examples of the volatile memory may include dynamic random access memory (DRAM), static RAM (SRAM), synchronous DRAM (SDRAM), phase-change RAM (PRAM), magnetic RAM (MRAM), resistive RAM (RRAM), ferroelectric RAM (Fe-RAM), etc. Examples of the non-volatile memory may include read only memory (ROM), programmable ROM (PROM), electrically programmable ROM (EPROM), electrically erasable programmable ROM (EEPROM), flash memory, and the like. The memory 110 may include a non-volatile medium such as a hard disk drive (HDD), a solid state disk (SSD), an embedded multimedia card (eMMC), a universal flash storage (UFS), and the like.

The communicator 120 may perform communication with an external device. The communicator 120 may transmit and receive various data by performing communication with the electronic apparatus 200.

The communicator 120 may receive a signal for requesting identification of integrity of an application stored in the electronic apparatus 200 from the electronic apparatus 200.

The application may include an application check module container. The application check module container may store (or temporarily store) the application check module to be described below.

The communicator 120 may transmit an application check module for identifying the integrity of the application stored in the electronic apparatus 200 to the electronic apparatus 200. The application check module may include a module for obtaining identification information of the application stored in the electronic apparatus 200.

The communicator 120 may receive the identification information corresponding to the application from the electronic apparatus 200. The identification information may be identification information generated by the application check module.

The communicator 120 may include a Wi-Fi chip, a Bluetooth chip, a wireless communication chip, etc.

The processor 130 may control an operation of the server 100.

The processor 130 may control hardware or software constituent elements connected to the processor 130 by driving an operating system or an operation program and perform various data processing and calculations. In addition, the processor 130 may load commands or data received from at least one other constituent element to a volatile memory to perform processing, and store various data in a non-volatile memory.

The processor 130 may be embodied as a specific processor for performing the operation (e.g., embedded processor) or a generic-purpose processor (e.g., a central processing unit (CPU) or an application processor) for performing the operations by executing at least one software program stored in a memory device, such as memory 110.

The processor 130 may control the communicator 120 to transmit an application check module for identifying integrity of the application stored in the electronic apparatus 200 to the electronic apparatus 200.

When a signal for requesting identification of integrity of the application is received from the electronic apparatus 200, the processor 130 may control the communicator 120 to transmit the application check module to the electronic apparatus 200.

The application check module may be a module that obtains the identification information of the application stored in the electronic apparatus 200. The application check module may be a module in which a hash algorithm is applied to the application stored in the electronic apparatus 200 to obtain a hash value of the application.

When transmitting the application check module to the electronic apparatus 200, the processor 130 may control the communicator 120 to transmit the application check module to which a signing key is injected to the electronic apparatus 200.

When receiving a request for identifying integrity of the application from the electronic apparatus 200, the processor 130 may control the communicator 120 to transmit the application check module including a signing key to the electronic apparatus 200. The signing key may be a key generated by a signature algorithm, but is not limited thereto.

The signing key may be a one-time key. The processor 130 may generate a new signing key at the time of transmitting the application check module to the electronic apparatus 200 and control the communicator 120 to transmit the application check module including the newly generated signing key to the electronic apparatus 200.

For example, the processor 130 may generate a new signing key which is different from a previous signing key when the signal requesting identification of integrity is received again, and control the communicator 120 to transmit the application check module including the newly generated signing key to the electronic apparatus 200.

The signing key may be obfuscated. Obfuscation refers to a technique for preventing attack using reverse engineering by making it difficult for an attacker such as a hacker to interpret the signing key.

For example, the processor 130 may obfuscate the signing key through various methods such as data obfuscation, control obfuscation, layout obfuscation, aggregate obfuscation, preventive obfuscation, code/data encryption, and the like. The controller 130 may control the communicator 120 to transmit the application check module including the obfuscated signing key to the electronic apparatus 200.

Therefore, the disclosure can effectively prevent an attack from an attacker by using a one-time signing key or an obfuscated signing key.

When identification information of the application is received from the electronic apparatus 200, the processor 130 may identify integrity of the application based on whether the signing key is signed in the identification information, and whether the identification information matches the pre-stored identification information. The identification information may be a signing key obtained by signing the hash value of the applications stored in the electronic apparatus 200 with the signing key.

As an example, when the signature value received from the electronic apparatus 200 is signed by the signing key, and the hash value matches the pre-stored hash value, the processor 130 may identify that the application is not forged or modulated. On the other hand, when the signature value is not signed by the signing key, or the hash value fails to match the pre-stored hash value, the processor 130 may identify that the application is forged or modulated.

When the validity of the signature value received from the electronic apparatus 200 is verified by a signature verification algorithm corresponding to the signing key, the processor 130 may identify that the signature value received from the electronic apparatus 200 is signed by the signing key. In other words, the processor 130, when the signature value received from the electronic apparatus 200 is decoded by the signature verification algorithm, may identify that the signature value received from the electronic apparatus 200 is signed by the signing key inserted into the application check module.

By identifying integrity of the application based on whether the identification information received from the electronic apparatus 200 is signed by the signing key included in the application check module, the disclosure may trust that the identification information of the application is obtained by the application check module provided by the server 100, and also trust the identification of the integrity of the application.

When the identification information is received after a predetermined time passes from when the application check module is transmitted to the electronic apparatus 200, the processor 130 may not identify the integrity of the application based on the received identification information. The predetermined time may vary depending on a user setting or command, and may be a time such as 30 seconds, 1 minute, etc.

When the identification information is received after a predetermined time passes from when the application check module is transmitted to the electronic apparatus 200, the processor 130 may not identify the integrity of the application based on the received identification information, but generate a new signing key which is different from the previous signing key and control the communicator 120 to transmit the application check module including the newly generated signing key to the electronic apparatus 200.

In an example, if identification information is received after a predetermined time for obtaining the identification information of the application stored in the electronic apparatus 200 passes, the identification information could be information manipulated by an attacker.

The newly generated signing key may be a signing key obfuscated at a level higher than the obfuscation level of the obfuscation technique applied to the previous signing key.

In other words, when the identification information is received after a predetermined time elapses from when the application check module is transmitted to the electronic apparatus 200, the processor 130 may control the communicator 120 to transmit the application check module including the signing key obfuscated at a relatively higher level than that of the obfuscation technique applied to the previous signing key to the electronic apparatus 200.

For example, when obfuscating the previous signing key through one obfuscation technique, the processor 130 may obfuscate the newly generated signing key by overlapping a plurality of obfuscation techniques to make it difficult for an attacker to analyze the signing key, thereby increasing the security strength. Accordingly, this disclosure can effectively defend against an attack.

It has been described that when the signal requesting identification of the integrity of the application is received from the electronic apparatus 200, the application check module is transmitted to the electronic apparatus 200.

However, the disclosure is not limited thereto. In an example, the processor 130 may control the communicator 120 to transmit the application check module to the electronic apparatus 200 in many cases.

In an example, the processor 130 may control the communicator 120 to transmit the application check module to the electronic apparatus 200 at a predetermined time interval. The predetermined time interval may vary depending on a user command and may be a time interval such as one week, one month, etc.

The processor 130 may control the communicator 120 to transmit the application check module to the electronic apparatus 200 when a signal requesting a service of an application is received from the electronic apparatus 200. As an example, the signal requesting the service of the application may be a signal requesting to update the application.

Therefore, the disclosure prevents important information of users from being leaked through forged or merged applications by identifying the integrity of the application stored in the electronic apparatus 200 without user's requests.

Figure 3A:
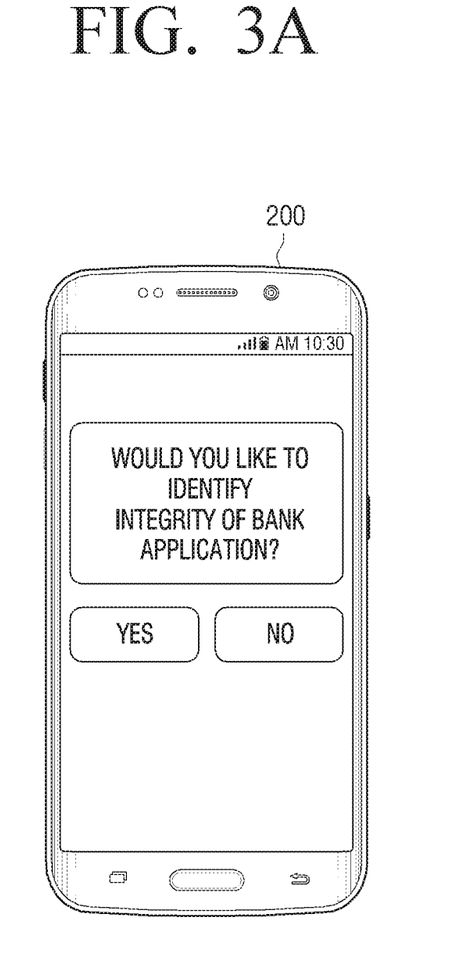
FIGS. 3A, 3B, and 3C are views to explain an example of identifying integrity of an application according to an embodiment of the disclosure.
Figure 3B:
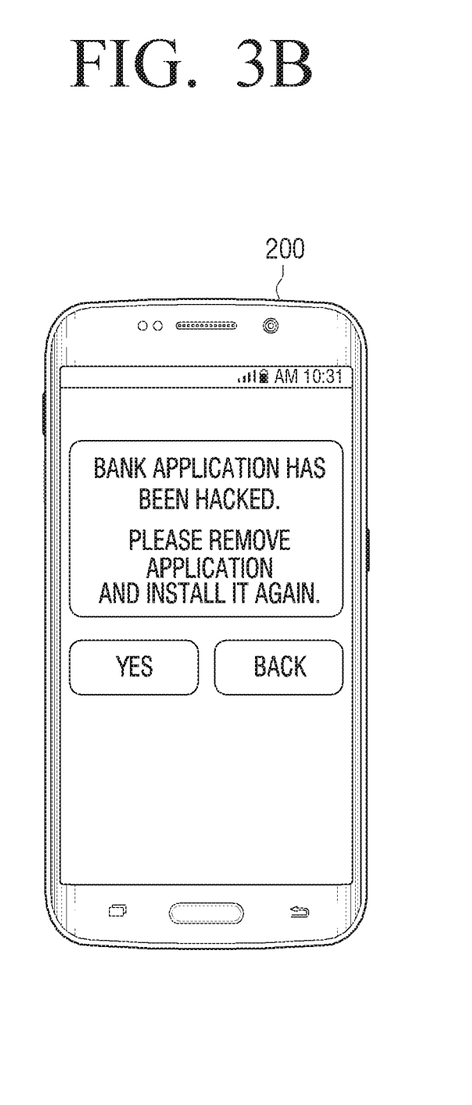
Figure 3C:
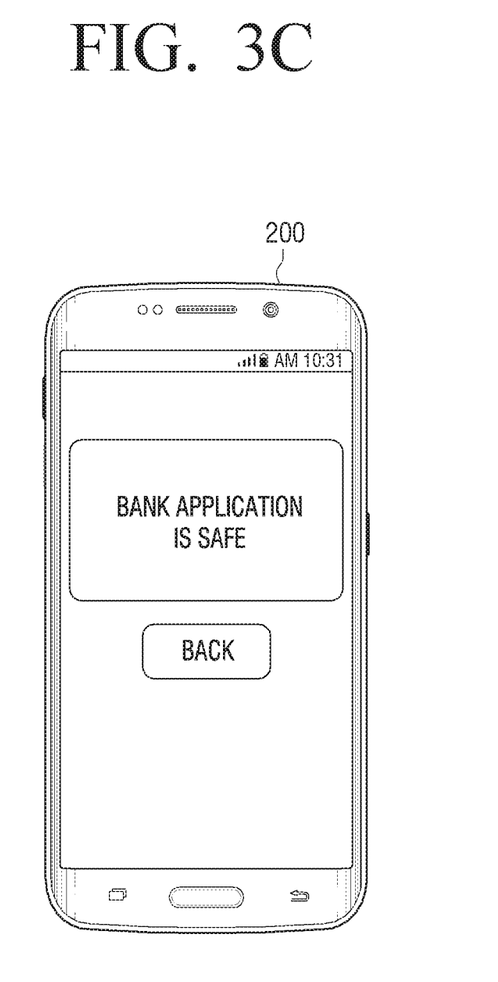

FIGS. 3A, 3B, to and 3C are views to explain an example of identifying integrity of an application according to an embodiment of the disclosure.

Referring to FIG. 3A, the electronic apparatus 200 may be embodied as a smartphone. However, the electronic apparatus 200 may be any of various electronic apparatuses such as a smart television (TV), a computer, a laptop, a personal computer (PC), a tablet, a camcorder, etc., as well as an IoT device such as a washing machine, a refrigerator, a robot vacuum cleaner, etc. In addition, the electronic apparatus 200 may be a wearable device such as a smart watch.

According to a user command, the electronic apparatus 200 may transmit a signal for requesting identification of the integrity of the application stored in the electronic apparatus 200 to the server 100.

For example, when a user input for requesting identification of the integrity is received, the electronic apparatus 200 may transmit the signal requesting the identification of integrity to the server 100.

The processor 130 may receive the signal requesting identification of the integrity of the application from the electronic apparatus 200 and control the communicator 120 to transmit the application check module including the signing key to the electronic apparatus 200.

When the application check module is received, the electronic apparatus 200 may transmit the identification information of the application stored in the electronic apparatus 200 to the server 100. The identification information may be a signature value obtained by signing the hash value of the application with the signing key.

When the identification information of the application is received, the processor 130 may identify the integrity of the application stored in the electronic apparatus 200. The processor 130, when the received signature value is signed by the signing key and the hash value matches the pre-stored hash value, may identify that the application is not forged or modulated. Oh the other hand, when the signature value is not signed by the signing key or the hash value fails to match the pre-stored hash value, the processor 130 may identify that the application is forged or modulated In addition, as a result of identification, the processor 130 may transmit a message for inducing deletion of the application to the electronic apparatus 200 if it is identified that the application is forged or modulated.

Referring to FIG. 3B, the processor 130 may transmit a message notifying that the application stored in the electronic apparatus 200 is hacked and inducing reinstallation of the application after deleting it to the electronic apparatus 200.

As a result of identification, when it is identified that the application is not forged or modulated, the processor 130 may transmit a message to the electronic apparatus 200 notifying that the application is safe.

Referring to FIG. 3C, the processor 130 may transmit a message that the application is safe to the electronic apparatus 200.

Therefore, the disclosure prevents personal information from being leaked through a forged or modulated application by providing the result of identification to the electronic apparatus 200.

Figure 4:
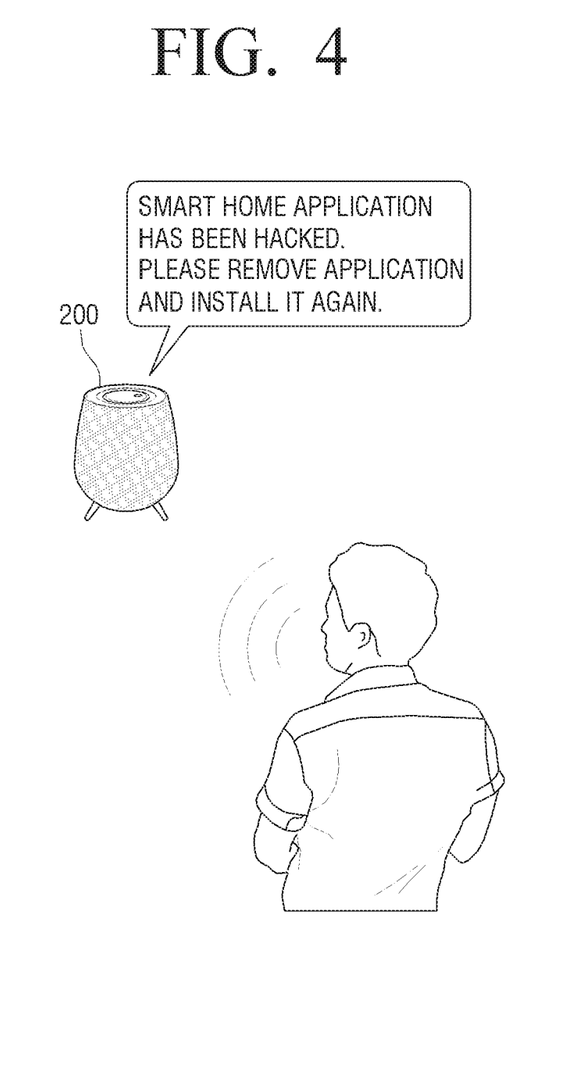
FIG. 4 is a view to explain an example of identifying integrity of an application according to an embodiment of the disclosure.

FIG. 4 is a view to explain an example of identifying integrity of an application according to an embodiment of the disclosure.

Referring to FIG. 4, the electronic apparatus 200 may be an artificial intelligence (AI) speaker that provides a home smart function.

In this case, when a user's voice for requesting identification of integrity of the application installed in the electronic apparatus 200 is received from a user, the electronic apparatus 200 may transmit a signal requesting identification of integrity of the application to the server 100.

As an example, the electronic apparatus 200 may convert a user voice into text through a Speech to Text (STT) algorithm and transmit the text to the server 100.

The processor 130 may control the communicator 120 to transmit an integrity check application for identifying the integrity of the application stored in the electronic apparatus 200 to the electronic apparatus 200 based on the text received from the electronic apparatus 200.

As described above, the processor 130 may receive identification information of the application stored in the electronic apparatus 200 from the electronic apparatus 200, and identify whether the application is forged or modulated based on whether the received identification information is signed by the signing key and whether the received identification information matches the pre-stored identification information.

As a result of identification, the processor 130, when the applications is identified as being forged or modulated, may transmit the signal corresponding to the voice that induces deletion of the application to the electronic apparatus 200.

Referring to FIG. 4, the processor 130 may transmit a signal corresponding to the voice notifying that the application stored in the electronic apparatus 200 is hacked and inducing reinstallation of the application after deleting it to the electronic apparatus 200.

Figure 5:
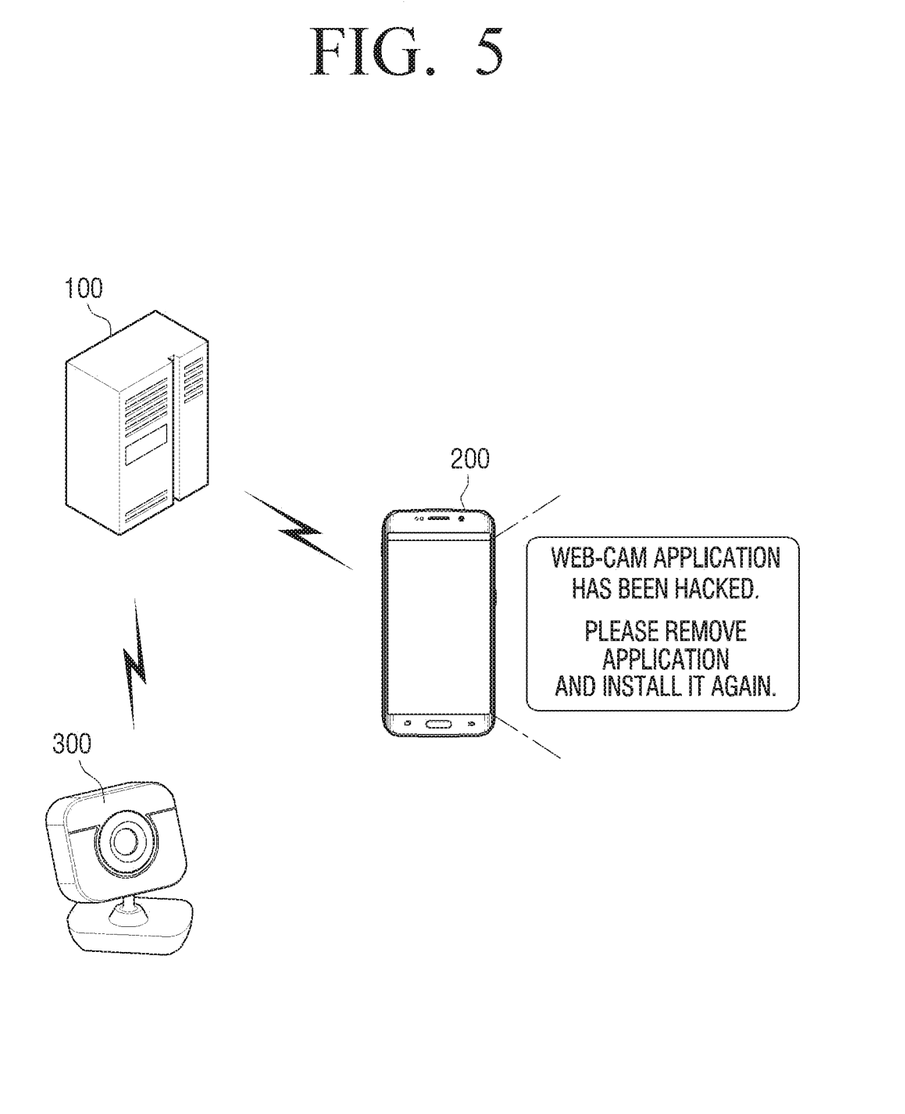
FIG. 5 is a view to explain an example of identifying integrity of an application according to an embodiment of the disclosure.

FIG. 5 is a view to explain an example of identifying integrity of an application according to an embodiment of the disclosure.

The processor 130 may receive a signal for requesting identification of integrity of an application from the electronic apparatus 200. The application may be an application that is stored in an external electronic apparatus.

Referring to FIG. 5, an external electronic apparatus 300 may be a webcam. Examples of the external electronic apparatus 300 may be various electronic apparatuses such as a washing machine, a refrigerator, an air conditioner, a robot vacuum cleaner, etc.

When a signal requesting to identify the integrity of the application stored in the external electronic apparatus 300 is received from the electronic apparatus 200, the processor 130 may transmit the application check module including the signing key to the external electronic apparatus 300.

The processor 130 may receive the identification information of the application stored in the external electronic apparatus 300 from the external electronic apparatus 300. The identification information may be a signature value obtained by signing the hash value of the application stored in the external electronic apparatus 300 with the signing key.

The processor 130 may receive the identification information of the application stored in the external electronic apparatus 300 from the external electronic apparatus 300, and identify whether the application is forged or modulated based on whether the received identification information is signed by the signing key and whether the received identification information matches the pre-stored identification information.

As a result of identification, when the application is identified as being forged or modulated, the processor 130 may transmit a message that induces deletion of the application to the electronic apparatus 200.

Referring to FIG. 5, the electronic apparatus 130 may transmit a message notifying that the application stored in the external electronic apparatus 300 is hacked and inducing reinstallation of the application after deleting it to the electronic apparatus 200.

As an example, by providing the user with the identification on the integrity of the application stored in the external electronic apparatus 300 in association with the electronic apparatus 200, such as when the external electronic apparatus 300 is an IoT device without a display or a speaker, the user may identify the integrity of an application more conveniently.

Figure 6:
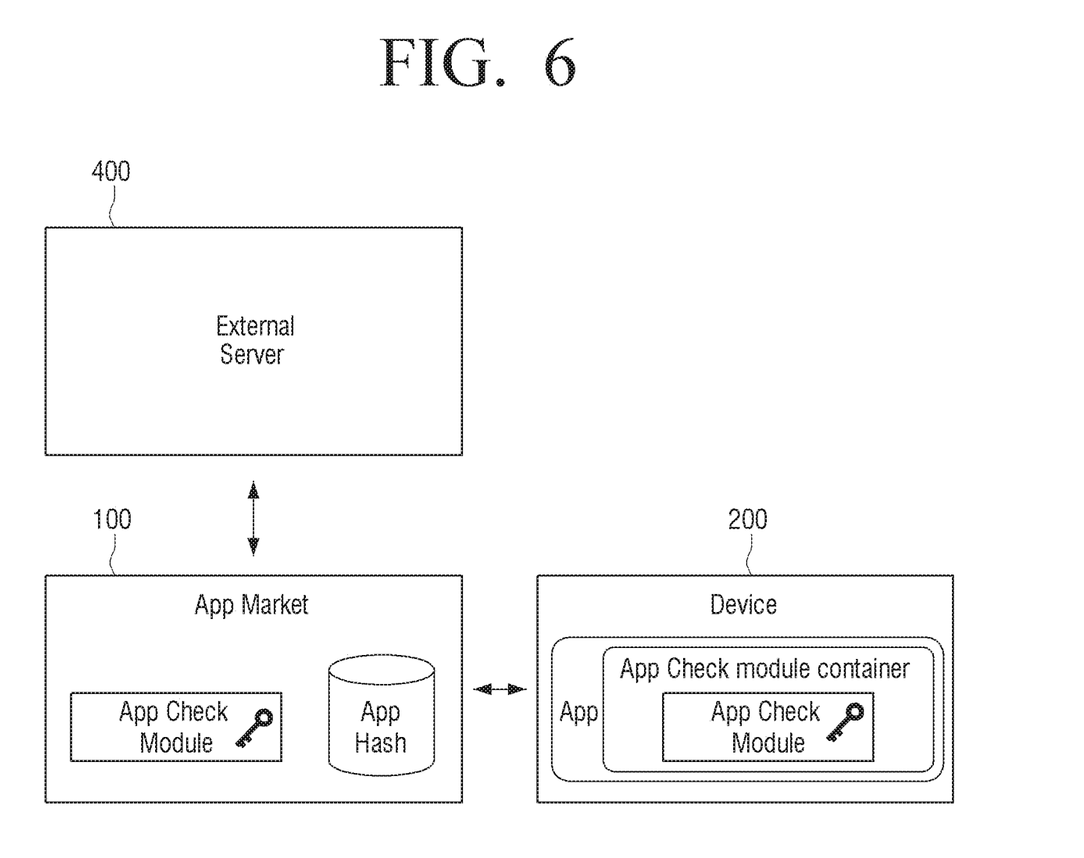
FIG. 6 is a block diagram to explain an example of identifying integrity of an application through an application market according to an embodiment of the disclosure.

FIG. 6 is a block diagram to explain an example of identifying integrity of an application through an application market according to an embodiment of the disclosure.

Referring to FIG. 6, the server 100 may be a market server for storing identification information of each of a plurality of applications. The server 100 may be a market server that stores various information on applications developed by application developers and transmits application installation files to electronic apparatuses.

The server 100 may receive a signal requesting identification of integrity of the application stored in the electronic apparatus 200 from an external server 400.

As an example, the external server 400, when the signal requesting for identification of the integrity of the application stored in the electronic apparatus 200 is received from the electronic apparatus 200, may transmit the signal requesting for identification of the integrity of the application stored in the electronic apparatus 200 to the server 100.

When the signal requesting for identification of the integrity of the application stored in the electronic apparatus 200 is received from the external server 400, the server 100 may transmit the application check module including the signing key to the electronic apparatus 200.

When identification information corresponding to the application stored in the electronic apparatus 200 is received from the electronic apparatus 200, the server 100 may identify information corresponding to the identification information of the application stored in the electronic apparatus 200 among a plurality of pre-stored pieces of identification information.

As an example, when a signature value obtained by signing (or calculating) the hash value of the application stored in the electronic apparatus 200 is received from the electronic apparatus 200, the server 100 may identify the integrity of the application based on whether the received signature value is signed by the signing key included in the application check module and whether the received hash value matches the hash value of the application.

The server 100 may transmit information on the identification result to the electronic apparatus 200 and/or the server 400. When the information on the identification result is transmitted to the server 400, the server 400 may transmit the information to the electronic apparatus 200.

When the server according to an embodiment of the disclosure is embodied as a market server, it is sufficient that the market sever is provided with hardware or software, and there is no need for all external servers managing applications to have hardware or software for identifying the integrity of the application. Therefore, an advantageous effect in technology and economy can be achieved.

Figure 7:
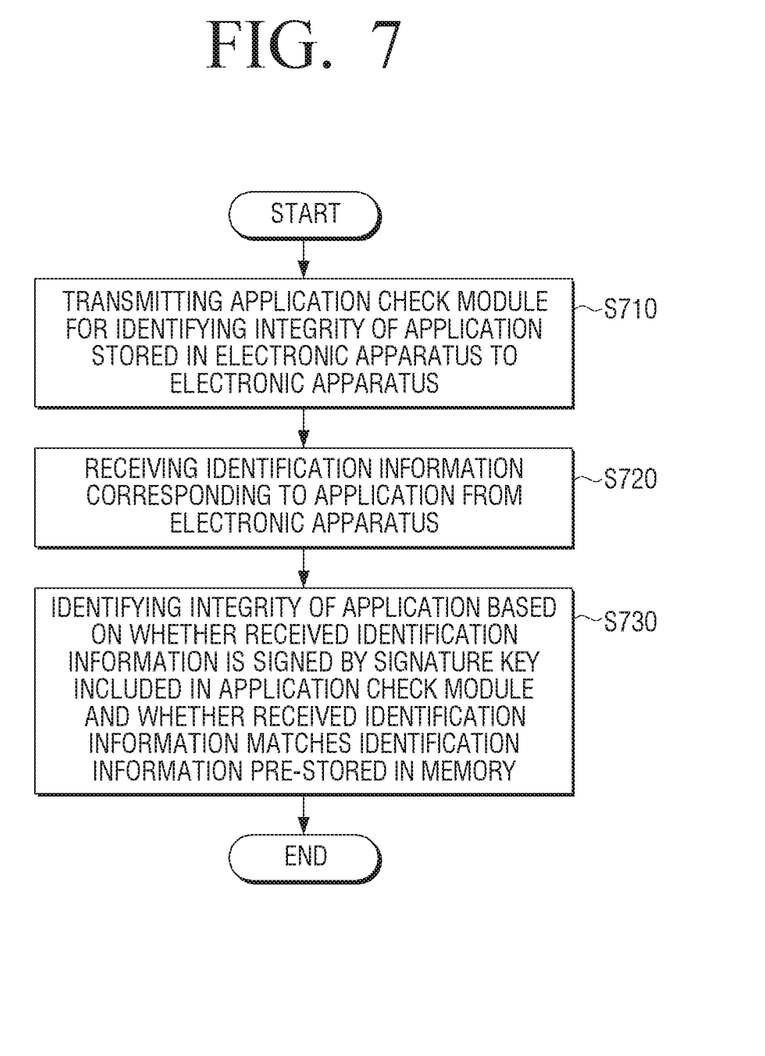
FIG. 7 is a flowchart for identifying integrity of an application according to an embodiment of the disclosure.

FIG. 7 is a flowchart for identifying integrity of an application according to an embodiment of the disclosure.

Referring to FIG. 7, the server 100 may transmit an application check module for identifying the integrity of an application stored in an electronic apparatus 200 to the electronic apparatus 200 at operation S710.

The application check module may be a module for obtaining the identification information of the application stored in the electronic apparatus 200. The application check module may be a module in which a hash value of the application is obtained by applying a hash algorithm to the application stored in the electronic apparatus 200.

The server 100 may transmit the application check module into which the signing key is injected to the electronic apparatus 200 in transmitting the application check module to the electronic apparatus 200.

The server 100 may receive identification information corresponding to the application from the electronic apparatus 200 at operation S720.

The server 100 may identify the integrity of the application based on whether the received identification information is signed by the signing key included in the application check module and whether the received identification information matches the identification information that is pre-stored in the memory at operation S730.

When the signing key is signed in the identification information received from the electronic apparatus 200, and the identification information matches the pre-stored identification information, the server 100 may identify that the application is not forged or modulated. On the other hand, when the signing key is not signed in the identification information or the identification information fails to match the pre-stored identification information, the server 100 may identify that the application is forged or modulated.

When the application is identified as being forged or modulated, the server 100 may induce deletion of the application.

The methods according to various example embodiments of the disclosure may be embodied in the form of software or an application that can be installed on a server of the related art.

The methods according to various example embodiments of the disclosure may be embodied as a software upgrade or a hardware upgrade with respect to a server of the related art.

In addition, various example embodiments of the disclosure can be performed through an embedded server provided in a server, or an external server.

A non-transitory computer readable medium that stores a program for sequentially performing a method for identifying integrity of an application according to an embodiment of the disclosure may be provided.

The non-transitory computer readable medium refers to a medium that stores data semi-permanently rather than storing data for a very short time, such as a register, a cache, and a memory, and is readable by an apparatus. As an example, the above-described various applications or programs may be stored in a non-transitory computer readable medium such as a compact disc (CD), a digital versatile disc (DVD), a hard disk, a Blu-ray disk, a universal serial bus (USB) memory stick, a memory card, and a read only memory (ROM), and may be provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A server comprising:
a memory;
a communicator; and
a processor configured to:
  transmit an application check module for identifying integrity of an application stored in an electronic apparatus to the electronic apparatus through the communicator, and
  based on identification information corresponding to the application being received from the electronic apparatus, identify integrity of the application based on the received identification information,
wherein the processor is further configured to identify integrity of the application based on:
  whether the received identification information is signed by a signing key included in the application check module, and
  whether the received identification information matches identification information that is pre-stored in the memory, and
wherein the processor is further configured to, based on a signal requesting to identify integrity of the application being received from the electronic apparatus, generate the signing key and transmit the application check module including the generated signing key to the electronic apparatus.

2. The server as claimed in claim 1, wherein the processor is further configured to deny the integrity of the application based on the received identification information not being signed by the signing key, or based on the received identification information failing to match the pre-stored identification information.

3. The server as claimed in claim 2, wherein the processor is further configured to transmit a message for inducing deletion of the application to the electronic apparatus.

4. The server as claimed in claim 1, wherein the processor is further configured to receive a signal requesting to identify integrity of an application stored in an external electronic apparatus from the electronic apparatus.

5. The server as claimed in claim 4, wherein the processor is further configured to transmit an application check module for identifying integrity of the application stored in the external electronic apparatus to the external electronic apparatus.

6. The server as claimed in claim 5, wherein the processor is further configured, identity of the external electronic apparatus being denied, to transmit to the electronic apparatus a message inducing deletion of the application stored in the external electronic apparatus.

7. The server as claimed in claim 1, wherein the processor is further configured to, based on the signal requesting to identify integrity of the application being received again, generate a new signing key that is different from the signing key, and transmit the application check module including the new signing key to the electronic apparatus.

8. The server as claimed in claim 1, wherein the processor is further configured to obfuscate the signing key and transmit the application check module including the obfuscated signing key to the electronic apparatus.

9. The server as claimed in claim 1,
wherein the identification information includes a signature value obtained by signing a hash value corresponding to the application with the signing key, and
wherein the processor is further configured to, validity of the signature value being verified based on a signature verification algorithm, identify that the received identification information is signed by the signing key.

10. The server as claimed in claim 1, wherein the processor is further configured to transmit the application check module including the signing key to the electronic apparatus at a predetermined time interval.

11. The server as claimed in claim 1, wherein the processor is further configured to, based on a signal requesting a service of the application being received, transmit the application check module including the signing key to the electronic apparatus.

12. The server as claimed in claim 1, wherein the processor is further configured to, based on the identification information being received after a predetermined period of time passes from a time at which the application check module is transmitted to the electronic apparatus, generate a new signing key that is different from the signing key without identifying integrity of the application based on the received identification information, and transmit the application check module including the new signing key to the electronic apparatus.

13. The server as claimed in claim 12, wherein the processor is further configured to obfuscate the new signing key at a relatively higher level than an obfuscation level of an obfuscation technique applied to the signing key, and transmit the application check module including the obfuscated signing key to the electronic apparatus.

14. A method for identifying integrity of an application, the method comprising:
  transmitting an application check module for identifying integrity of an application stored in an electronic apparatus to the electronic apparatus; and
  based on identification information corresponding to the application being received from the electronic apparatus, identifying integrity of the application based on the received identification information,
wherein the identifying of the integrity of the application is based on:
  whether the received identification information is signed by a signing key included in the application check module, and
  whether the received identification information matches pre-store identification information, and wherein the transmitting comprises, based on a signal requesting to identify integrity of the application being received from the electronic apparatus, generating the signing key and transmitting the application check module including the signing key to the electronic apparatus.

15. The method as claimed in claim 14, wherein the identifying comprises denying the integrity of the application based on the received identification information not being signed by the signing key or based on the received identification information failing to match the pre-stored identification information.

16. The method as claimed in claim 14, further comprising:
based on the signal requesting to identify integrity of the application being received again, generating a new signing key that is different from the signing key, and transmitting the application check module including the new signing key to the electronic apparatus.

17. The method as claimed in claim 14, wherein the transmitting comprises obfuscating the signing key, and transmitting the application check module including the obfuscated signing key to the electronic apparatus.

18. The method as claimed in claim 14,
wherein the identification information includes a signature value obtained by signing a hash value corresponding to the application with the signature value, and
wherein the identifying comprises, based on validity of the signature value being verified based on a signature verification algorithm, identifying that the received identification information is signed by the signing key.

19. The method as claimed in claim 14, wherein the transmitting comprises identifying integrity of an application that transmits an application check module including the signing key to the electronic apparatus at a predetermined time interval.

20. The method as claimed in claim 14, wherein the transmitting comprises, based on a signal requesting a service of the application being received from the electronic apparatus, transmitting an application check module including the signing key to the electronic apparatus.

21. The method as claimed in claim 14, further comprising:
based on the identification information begin received after a predetermined time passes from a time at which the application check module is transmitted to the electronic apparatus,
generating a new signing key that is different from the signing key without identifying integrity of the application based on the received identification information, and
transmitting the application check module including the new signing key to the electronic apparatus.

22. A system for identifying integrity of an application, comprising:
a server comprising a first memory and a first processor, wherein the server is configured to store identification information of each of a plurality of applications; and
an external server comprising a second memory and a second processor, wherein the external server is configured to transmit a signal requesting to identify integrity of an application stored in an electronic apparatus to the server,
wherein the server is further configured to:
based on the signal requesting to identify integrity of the application being received from the electronic apparatus, generate a signing key and transmit an application check module including the generated signing key to the electronic apparatus, and
based on identification information corresponding to the application being received from the electronic apparatus, identify integrity of the application based on the received identification information, and
wherein the server is further configured to identify integrity of the application based on:
whether the received identification information is signed by the signing key included in the application check module, and
whether the received identification information matches identification information of the application among a plurality of pieces of identification information which are pre-stored in the first memory.

* * * * *